US012572653B2

(12) United States Patent
Lee et al.

(10) Patent No.: US 12,572,653 B2
(45) Date of Patent: Mar. 10, 2026

(54) METHOD AND DEVICE FOR ANALYZING AND PROCESSING MALICIOUS CODE FOR CONTAINER IMAGE, AND COMPUTER-READABLE RECORDING MEDIUM

(71) Applicant: SGA Solutions Co., Ltd., Seoul (KR)

(72) Inventors: Ki Uk Lee, Seongnam-si (KR); Ju Young Park, Seongnam-si (KR)

(73) Assignee: SGA Solutions Co., Ltd., Seoul (KR)

( * ) Notice: Subject to any disclaimer, the term of this patent is extended or adjusted under 35 U.S.C. 154(b) by 515 days.

(21) Appl. No.: 18/087,116

(22) Filed: Dec. 22, 2022

(65) Prior Publication Data

US 2024/0169062 A1      May 23, 2024

(30) Foreign Application Priority Data

Nov. 17, 2022     (KR) ........................ 10-2022-0154089

(51) Int. Cl.
*G06F 21/56*        (2013.01)
*G06F 21/55*        (2013.01)

(52) U.S. Cl.
CPC .......... *G06F 21/565* (2013.01); *G06F 21/554* (2013.01)

(58) Field of Classification Search
CPC .... G06F 21/565; G06F 21/554; G06F 21/577; G06F 2221/033
See application file for complete search history.

(56) References Cited

U.S. PATENT DOCUMENTS

| | | | | |
|---|---|---|---|---|
| 9,355,247 | B1 * | 5/2016 | Thioux .................... | G06F 21/53 |
| 10,104,185 | B1 * | 10/2018 | Sharifi Mehr ...... | G06F 9/45558 |
| 11,580,230 | B2 * | 2/2023 | Bhatt ....................... | G06F 21/52 |
| 2005/0149726 | A1 * | 7/2005 | Joshi ....................... | G06F 21/51 726/4 |
| 2013/0031604 | A1 * | 1/2013 | Esselink ............. | H04W 12/069 726/3 |
| 2013/0139217 | A1 * | 5/2013 | Xie ..................... | H04L 63/0281 726/1 |
| 2016/0323317 | A1 * | 11/2016 | Pritchard ................ | G06F 21/35 |
| 2017/0116415 | A1 * | 4/2017 | Stopel ..................... | G06F 21/52 |
| 2017/0177877 | A1 * | 6/2017 | Suarez ................ | G06F 21/6218 |
| 2019/0156023 | A1 * | 5/2019 | Gerebe ................... | G06F 21/51 |
| 2020/0082094 | A1 * | 3/2020 | Mcallister ................. | G06F 8/77 |

(Continued)

*Primary Examiner* — Catherine Thiaw
*Assistant Examiner* — Amir Mahdi Hajiabbasi

(57)             ABSTRACT

The present invention relates to a method for analyzing and processing a malicious code for a container image, includes: a container image storage step of storing a container image in a temporary directory by copying the container image to the database; a verification analysis process starting step of starting an integrity verification process for the container image, and starting an image analysis process and a policy analysis process; an abnormality determination step of determining an abnormality for the container image based on first analysis result information and second analysis result information when the first analysis result information and the second analysis result information have been acquired; and a download allowance step of allowing the user account to download the container image by allowing a download of the container image, when it is determined that the container image is normal by performing a function of the abnormality determination step.

8 Claims, 7 Drawing Sheets

(56)                References Cited

U.S. PATENT DOCUMENTS

2021/0243192 A1*   8/2021  Kim ........................ H04L 63/20
2021/0382997 A1*  12/2021  Yi .......................... G06F 21/577
2022/0179959 A1*   6/2022  Silveira ................. G06F 21/575
2023/0259386 A1*   8/2023  Yue ........................ H04L 63/20
                                                  726/1

* cited by examiner

FIG. 2

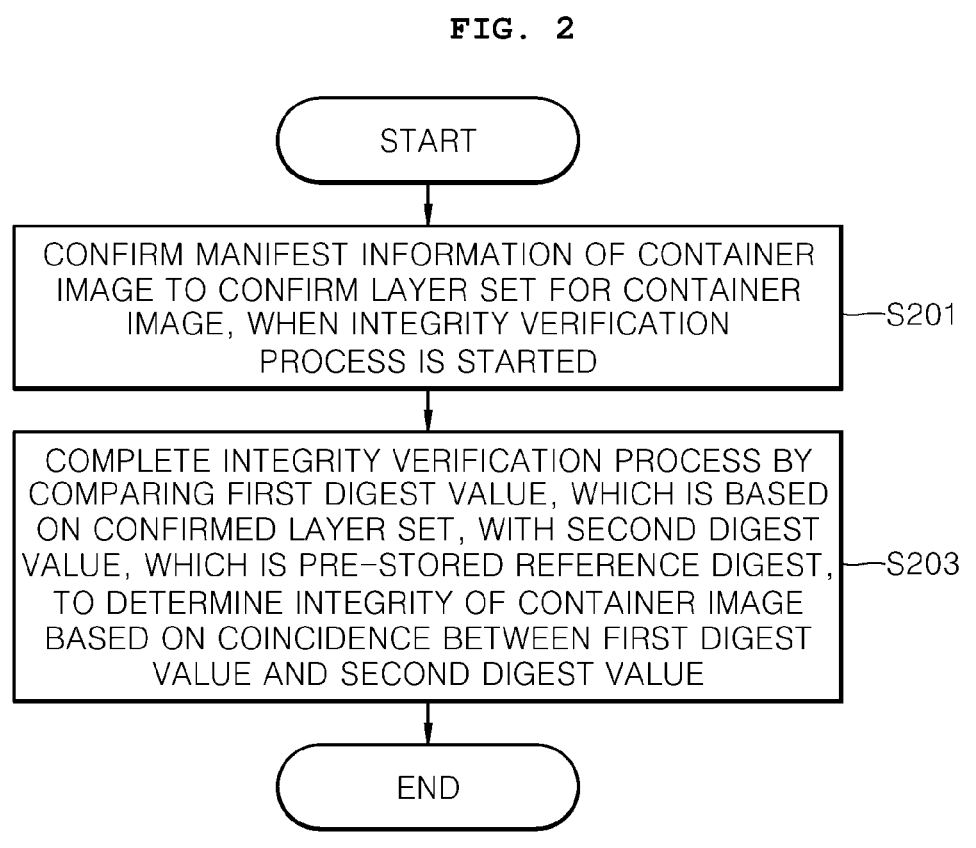

```
                    ┌──────────────┐
                    │    START     │
                    └──────────────┘
                           │
                           ▼
┌──────────────────────────────────────────────────┐
│   CONFIRM MANIFEST INFORMATION OF CONTAINER        │
│   IMAGE TO CONFIRM LAYER SET FOR CONTAINER         │
│   IMAGE, WHEN INTEGRITY VERIFICATION               │──S201
│   PROCESS IS STARTED                               │
└──────────────────────────────────────────────────┘
                           │
                           ▼
┌──────────────────────────────────────────────────┐
│   COMPLETE INTEGRITY VERIFICATION PROCESS BY       │
│   COMPARING FIRST DIGEST VALUE, WHICH IS BASED     │
│   ON CONFIRMED LAYER SET, WITH SECOND DIGEST       │
│   VALUE, WHICH IS PRE-STORED REFERENCE DIGEST,     │──S203
│   TO DETERMINE INTEGRITY OF CONTAINER IMAGE        │
│   BASED ON COINCIDENCE BETWEEN FIRST DIGEST        │
│   VALUE AND SECOND DIGEST VALUE                    │
└──────────────────────────────────────────────────┘
                           │
                           ▼
                    ┌──────────────┐
                    │     END      │
                    └──────────────┘
```

FIG. 4

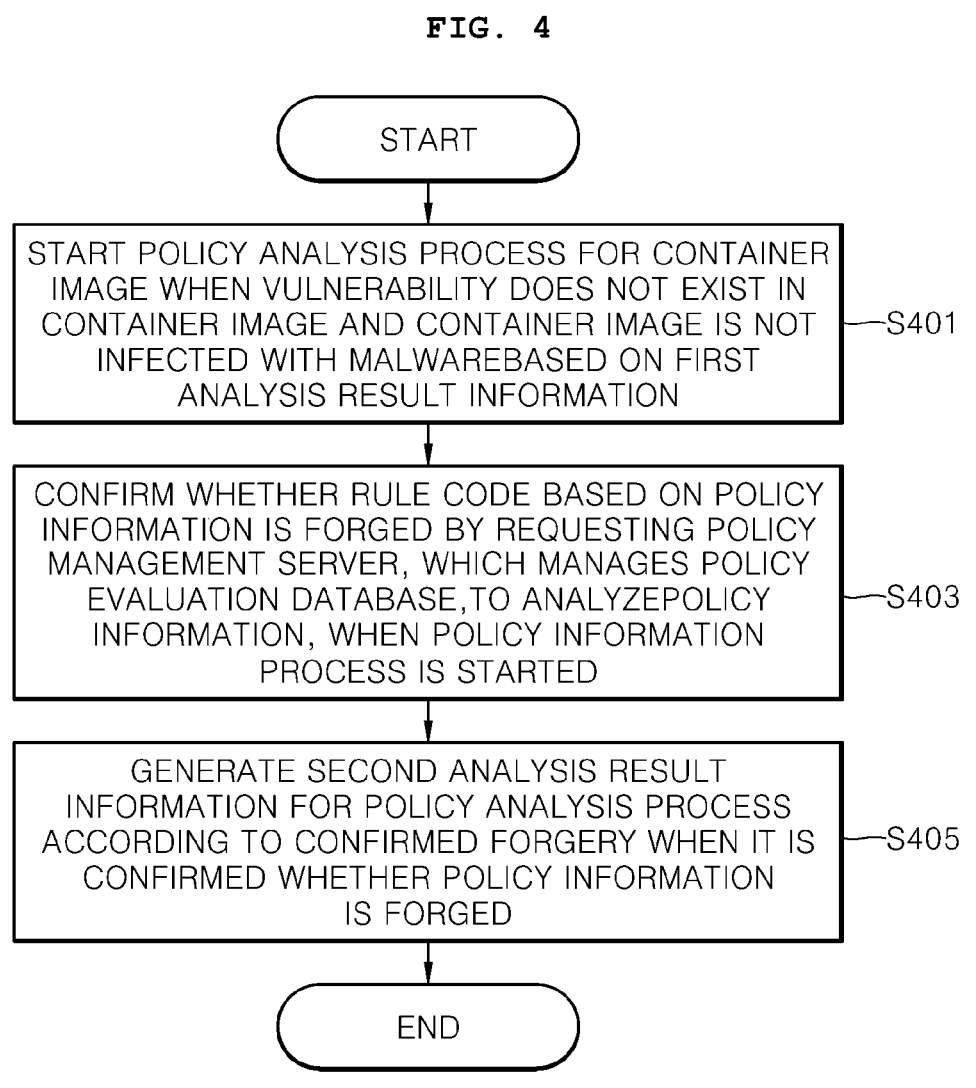

START

START POLICY ANALYSIS PROCESS FOR CONTAINER IMAGE WHEN VULNERABILITY DOES NOT EXIST IN CONTAINER IMAGE AND CONTAINER IMAGE IS NOT INFECTED WITH MALWAREBASED ON FIRST ANALYSIS RESULT INFORMATION —S401

CONFIRM WHETHER RULE CODE BASED ON POLICY INFORMATION IS FORGED BY REQUESTING POLICY MANAGEMENT SERVER, WHICH MANAGES POLICY EVALUATION DATABASE,TO ANALYZEPOLICY INFORMATION, WHEN POLICY INFORMATION PROCESS IS STARTED —S403

GENERATE SECOND ANALYSIS RESULT INFORMATION FOR POLICY ANALYSIS PROCESS ACCORDING TO CONFIRMED FORGERY WHEN IT IS CONFIRMED WHETHER POLICY INFORMATION IS FORGED —S405

END

METHOD AND DEVICE FOR ANALYZING AND PROCESSING MALICIOUS CODE FOR CONTAINER IMAGE, AND COMPUTER-READABLE RECORDING MEDIUM

BACKGROUND OF THE INVENTION

1. Field of the Invention

The present invention relates to a method for analyzing and processing a malicious code for a container image, and more specifically, to a technology in which when a download request for a container image stored in a database is received from a user account, the container image is copied and stored in a temporary directory, which is a virtual storage interworking with the database, when integrity is verified by starting an integrity verification process for the container image stored in the temporary directory, an image analysis process and policy analysis process for the container image are started, when first analysis result information, which is result information of the image analysis process for the container image, and second analysis result information, which is result information of the policy analysis process of the container image, have been acquired, an abnormality for the container image is determined based on the first analysis result information and the second analysis result information, and when it is determined that the container image is normal, the container image is allowed to be downloaded by the user account.

2. Description of the Related Art

As time goes by, it is analyzed that domestic malicious code spreading methods are being advanced. Regarding the recent malicious code spreading trends, attack techniques such as "malvertising" and "e-mail attachments" have been specified and diversified, and attack targets appear to be changed. According to a report that analyzes trends in the first half of 2022 released by Korea Internet & Security Agency (KISA), most of the previous methods for spreading malicious codes refer to methods for exploiting software vulnerabilities on homepages, such as "drive-by download". However, KISA has recently announced that in accordance with advance of the attack techniques, the attack targets also appear to be changed from many and unspecified targets to specific targets such as companies, individuals, and specific devices.

Accordingly, various technologies are being developed in the industries to prevent damage caused by malicious codes.

For example, Korean Unexamined Patent Publication No. 10-2017-0087007 (electronic device for analyzing malicious code and method therefore) discloses a technology that analyzes an executable file before receiving and executing the executable file to confirm whether malicious code suspicious data exists in the executable file.

However, the above related art discloses only a technology that simply confirms whether the malicious code suspicious data exists in the executable file, and does not disclose a technology in which when a download request for a container image stored in a database is received from a user account, the container image is copied and stored in a temporary directory, which is a virtual storage interworking with the database, when integrity is verified by starting an integrity verification process for the container image stored in the temporary directory, an image analysis process and policy analysis process for the container image are started, when first analysis result information, which is result information of the image analysis process for the container image, and second analysis result information, which is result information of the policy analysis process of the container image, have been acquired, an abnormality for the container image is determined based on the first analysis result information and the second analysis result information, and when it is determined that the container image is normal, the container image is allowed to be downloaded by the user account. Thus, there is also a need for a technology that can solve the problem.

SUMMARY OF THE INVENTION

Accordingly, an object of the present invention is to provide a method for analyzing and processing a malicious code for a container image, in which when a download request for a container image stored in a database is received from a user account, the container image is copied and stored in a temporary directory, which is a virtual storage interworking with the database, when integrity is verified by starting an integrity verification process for the container image stored in the temporary directory, an image analysis process and policy analysis process for the container image are started, when first analysis result information, which is result information of the image analysis process for the container image, and second analysis result information, which is result information of the policy analysis process of the container image, have been acquired, an abnormality for the container image is determined based on the first analysis result information and the second analysis result information, and when it is determined that the container image is normal, the container image is allowed to be downloaded by the user account. Therefore, it is possible to efficiently confirm whether the malicious code for the container image exists without causing damage to a server side and a user side.

According to one embodiment of the present invention, there is provided a method for analyzing and processing a malicious code for a container image, which is implemented in a computing device including one or more processors and one or more memories for storing instructions executable in the processors, including: a container image storage step of storing a container image in a temporary directory, which is a virtual storage interworking with a database, by copying the container image stored in the database, when a download request for the container image stored in the database is received from a user account; a verification analysis process starting step of starting an integrity verification process for the container image when the container image has been stored in the temporary directory, and starting an image analysis process and a policy analysis process when integrity of the container image is verified; an abnormality determination step of determining an abnormality for the container image based on first analysis result information, which is result information of the image analysis process for the container image, and second analysis result information, which is result information of the policy analysis process for the container image, when the first analysis result information and the second analysis result information have been acquired as the image analysis process and the policy analysis process have been completed; and a download allowance step of allowing the user account to download the container image by allowing a download of the container image, when it is determined that the container image is normal by performing a function of the abnormality determination step.

Preferably, the temporary directory may be a temporary storage for confirming whether the container image includes a malicious code before the user account downloads the container image, in which the temporary directory may be generated when the download request is received from the user account, and may be immediately deleted when the download allowance step is completed or the container image includes the malicious code.

The verification analysis process starting step may include:

an integrity verification confirmation step of confirming manifest information of the container image to confirm a layer set for the container image, when the integrity verification process is started; and a verification process completion step of completing the integrity verification process by comparing a first digest value, which is based on the confirmed layer set, with a second digest value, which is a pre-stored reference digest, to determine the integrity of the container image based on coincidence between the first digest value and the second digest value.

The verification analysis process starting step may further include: an image analysis process starting step of starting an image analysis process for the container image when the integrity of the container image has been verified by performing a function of the verification process completion step; a vulnerability inspection step of, when the image analysis process is started, completing a vulnerability inspection for the container image by extracting policy information for the container image from the container image to store the policy information in a policy evaluation database, and extracting software bill of materials (SBOM) information from the container image from which the policy information is extracted to compare detailed information included in the SBOM information with pre-stored vulnerability reference information; a malicious code infection inspection step of completing a malicious code inspection for the container image by comparing the SBOM information with pre-stored malware reference information to confirm whether at least one of detailed information included in the SBOM information is infected with malware, when the vulnerability inspection step has been completed; and a first analysis result information generation step of generating the first analysis result information for the image analysis process based on a result of the vulnerability inspection step and a result of the malicious code infection inspection step, when functions of the vulnerability inspection step and malicious code infection inspection step have been performed.

The verification analysis process starting step may further include: a policy analysis process starting step of starting the policy analysis process for the policy information stored in the policy evaluation database, when it is confirmed that the vulnerability does not exist in the container image and the container image is not infected with the malware based on the first analysis result information; a policy forgery confirmation step of confirming whether a rule code based on the policy information is forged by requesting a policy management server, which manages the policy evaluation database, to analyze the policy information, when the policy analysis process is started; and a second analysis result information generation step of, when the policy information is forged by a function of the policy forgery confirmation step, generating the second analysis result information about the policy analysis process according to the confirmed forgery.

In the abnormality determination step, if the first analysis result information and the second analysis result information have been generated, when it is determined that the container image is abnormal based on the first analysis result information and the second analysis result information, abnormality information about the container image may be provided to a manager account, the temporary directory may be deleted, and a lock may be set so that a plurality of user accounts are not allowed to request the download of the container image stored in the database.

The download allowance step may include: an access allowance step of allowing an access of the user account to the temporary directory when it is determined that the container image is normal by performing the function of the abnormality determination step; an analysis completion information storage step of storing analysis completion information for the container image by deleting the temporary directory, and simultaneously, generating the analysis completion information to match the analysis completion information to the container image stored in the database, when the user account has downloaded the container image; and an analysis process skipping step of skipping the integrity verification process, the image analysis process, and the policy analysis process to allow the user account to download the container image stored in the database, if the container image corresponds to the analysis completion information by comparing the container image stored in the database with the analysis completion information, when a request to download the container image stored in the database is received again by the user account in a state where the analysis completion information storage step is completed.

According to one embodiment of the present invention, there is provided a device for analyzing and processing a malicious code for a container image, which is implemented in a computing device including one or more processors and one or more memories for storing instructions executable in the processors, including: a container image storage unit which stores a container image in a temporary directory, which is a virtual storage interworking with a database, by copying the container image stored in the database, when a download request for the container image stored in the database is received from a user account; a verification analysis process starting unit which starts an integrity verification process for the container image when the container image has been stored in the temporary directory, and starts a verification analysis process and a policy analysis process when integrity of the container image is verified; an abnormality determination unit which determines an abnormality for the container image based on first analysis result information, which is result information of the image analysis process for the container image, and second analysis result information, which is result information of the policy analysis process for the container image, when the first analysis result information and the second analysis result information have been acquired as the image analysis process and the policy analysis process have been completed; and a download allowance unit which allows the user account to download the container image by allowing a download of the container image, when it is determined that the container image is normal by performing a function of the abnormality determination unit.

According to one embodiment of the present invention, there is provided a computer-readable recording medium that stores instructions for allowing a computing device to perform the following steps, in which the steps include: a container image storage step of storing a container image in a temporary directory, which is a virtual storage interworking with a database, by copying the container image stored in the database, when a download request for the container image stored in the database is received from a user account; a verification analysis process starting step of starting an integrity verification process for the container image when the container image has been stored in the temporary directory, and starting an image analysis process and a policy analysis process when integrity of the container image is verified; an abnormality determination step of determining an abnormality for the container image based on first analysis result information, which is result information of the image analysis process for the container image, and second analysis result information, which is result information of the policy analysis process for the container image, when the first analysis result information and the second analysis result information have been acquired as the image analysis process and the policy analysis process have been completed; and a download allowance step of allowing the user account to download the container image by allowing a download of the container image, when it is determined that the container image is normal by performing a function of the abnormality determination step.

According to the method for analyzing and processing a malicious code for a container image, it is possible to prevent damage caused by the malicious code to the server side and the user side by confirming whether the malicious code for the container image exists in the temporary directory.

Further, it is possible to prevent damage caused by forgery of the container image by efficiently confirming not only just the malicious code, but also the forgery of integrity and security policy for the container image.

BRIEF DESCRIPTION OF THE DRAWINGS

FIG. 2 is a flowchart for explaining a verification analysis process starting step of the method for analyzing and processing a malicious code for a container image according to one embodiment of the present invention.

FIG. 4 is still another flowchart for explaining the verification analysis process starting step of the method for analyzing and processing a malicious code for a container image according to one embodiment of the present invention.

DETAILED DESCRIPTION OF THE INVENTION

Hereinafter, various embodiments and/or aspects will now be disclosed with reference to drawings. In the following description, for the purpose of a description, multiple detailed matters will be disclosed in order to help comprehensive appreciation of one or more aspects. However, those skilled in the art will recognize that the aspect(s) can be executed without the detailed matters. In the following disclosure and the accompanying drawings, specific exemplary aspects of one or more aspects will be described in detail. However, the aspects are exemplary and some of various methods in principles of various aspects may be used, and the descriptions are intended to include all of the aspects and equivalents thereof.

In "embodiment", "example", "aspect", "illustration", and the like used in the specification, it may not be construed that a predetermined aspect or design which is described is more excellent or advantageous than other aspects or designs.

The term "comprises (includes)" and/or "comprising (including)" means that the corresponding feature and/or component is present, but it should be appreciated that presence or addition of one or more other features, components, and/or a group thereof is not excluded.

Although the terms including an ordinal number such as first, second, etc. can be used for describing various elements, the structural elements are not restricted by the terms. The terms are used merely for the purpose to distinguish an element from the other elements. For example, a first component may be referred to as a second component and vice versa without departing the scope of the present invention. As used herein, the term "and/or" includes any and all combinations of one or more associated items.

In addition, in the embodiments of the present invention, all terms used herein, including technical or scientific terms, have the same meaning as commonly understood by one of ordinary skill in the art to which the present invention belongs, unless otherwise defined. Terms such as those defined in commonly used dictionaries should be interpreted as having a meaning consistent with the contextual meaning of the related art and should not be interpreted as either ideal or overly formal in meaning unless explicitly defined in the present invention.

Figure 1:
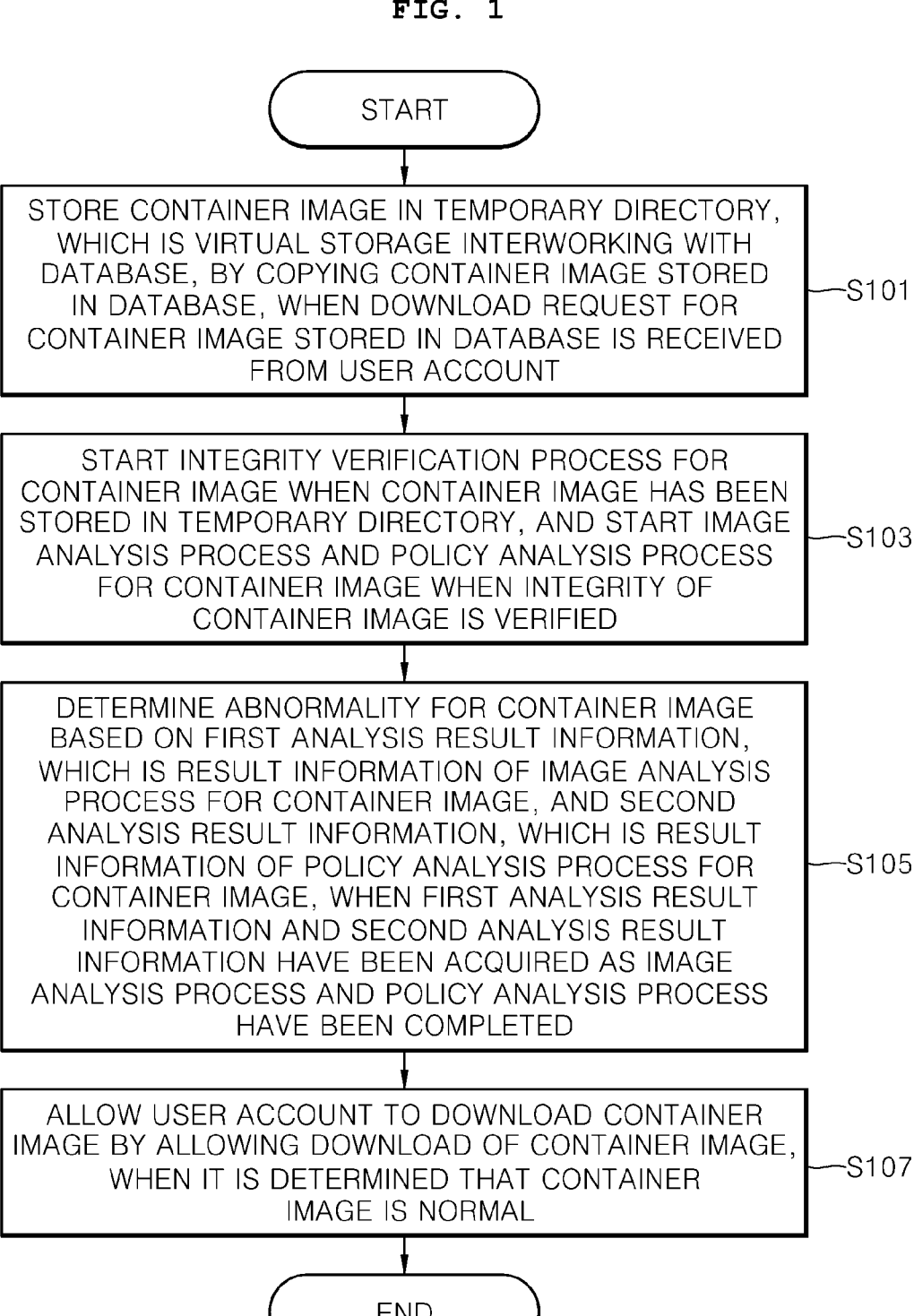
FIG. 1 is a flowchart for explaining a method for analyzing and processing a malicious code for a container image according to one embodiment of the present invention.

FIG. 1 is a flowchart for explaining a method for analyzing and processing a malicious code for a container image according to one embodiment of the present invention.

Referring to FIG. 1, the method for analyzing and processing a malicious code for a container image, which is implemented in a computing device including one or more processors and one or more memories for storing instructions executable in the processors, may include a container image storage step (S101), a verification analysis process starting step (S103), an abnormality determination step (S105), and a download allowance step (S107).

In S101, when a download request for a container image stored in a database is received from a user account, the one or more processors (hereinafter referred to as a processor) may store the container image in a temporary directory, which is a virtual storage interworking with the database, by copying the container image stored in the database.

According to one embodiment, the container image means a configuration corresponding to one file including files and setting values (e.g.: server programs, source codes and libraries, complied executable files, etc.) required to execute software in a database independent from a virtual environment. In this case, the image referred to herein may mean information including files and setting values required to execute a container, not images such as pictures that are generally known.

According to one embodiment, the database is configured to store the container image, and may mean a storage space of a specific platform in which the container image is stored for providing the container image to a plurality of user accounts, when the processor receives the download request from at least one of the plurality of user accounts.

According to one embodiment, when the download request for the container image is received from the user account, the processor may generate a temporary directory, which is a virtual storage interworking with the database. Thereafter, the processor may copy the container image stored in the database and store the container image in the generated temporary directory.

According to one embodiment, the processor may perform the verification analysis process starting step (S103) when the container image has been stored in the temporary directory.

In S103, the processor may start an integrity verification process for the container image when the container image has been stored in the temporary directory, and may start an image analysis process and policy analysis process for the container image when the integrity of the container image is verified.

According to one embodiment, the integrity verification process refers to a process for confirming whether the container image stored in the temporary directory is forged, and more specifically, may refer to a process for confirming forgery of configuration and layer set of the container image through manifest information of the container image. In this regard, a detailed description in which the processor performs the integrity verification process will be described with reference to FIG. 2.

According to one embodiment, when the integrity verification of the container image has been verified by performing the integrity verification process for the container image, the processor may start the image analysis process and policy analysis process for the container image.

In this regard, the image analysis process may refer to a process for confirming whether vulnerability and malicious code (malware) exist for detailed information (e.g.: OS information, file information, user access account information, etc.) included in the container image. In addition, the policy analysis process may refer to a process for confirming whether policy information (e.g.: information related to security policy) included in the container image is forged. A detailed description related to the image analysis process will be described with reference to FIG. 3, and a detailed description related to the policy analysis process will be described with reference to FIG. 4.

According to one embodiment, when the image analysis process and the policy analysis process have been completed, the processor may perform the abnormality determination step (S105).

In S105, as the image analysis process and the policy analysis process have been completed, the processor may determine an abnormality for the container image based on first analysis result information, which is result information of the image analysis process for the container image, and second analysis result information, which is result information of the policy analysis process for the container image.

According to one embodiment, the processor may confirm vulnerability and malicious code infection of the container image through the first analysis result information. That is, the first analysis result information may be information to confirm the vulnerability and malicious code infection for the container image in which the image analysis process is performed.

According to one embodiment, the processor may confirm whether the security policy of the container image is forged through the second analysis result information. That is, the second analysis result information may be information to confirm whether the security policy of the container image in which the policy analysis process is performed is forged.

Accordingly, the process may determine the abnormality of the container image through the first analysis result information and the second analysis result information. In this regard, the processor may determine that the abnormality exists in the container image when it is confirmed that the container image corresponds to at least one of the vulnerability existence, the malware infection, and the security policy forgery through at least one of the first analysis result information and the second analysis result information.

According to one embodiment, when it is determined that the container image is normal by performing a function of the abnormality determination step (S105), the processor may perform the download allowance step (S107).

In S107, when it is determined that the container image is normal by performing the function of the abnormality determination step (S105), the processor may allow the user account to download the container image by allowing a download of the container image.

According to one embodiment, when it is confirmed that the vulnerability does not exist in the container image, the container image is not infected with malware, and the security policy is not forged through at least one of the first analysis result information and the second analysis result information, the processor may allow the user account to download the container image stored in the temporary directory. Accordingly, the user account may download the container image stored in the temporary directory.

In this regard, the temporary directory is a virtual storage for confirming whether the container image includes a malicious code before the user account downloads the container image, and may be a virtual storage generated by interworking with the database when the processor receives the download request from the user account. The temporary directory may be immediately deleted when the download allowance step (S107) has been completed or the malicious code is included in the container image. In addition, the temporary directory may be immediately deleted when the vulnerability of the container image exists or the security policy is forged.

FIG. 2 is a flowchart for explaining a verification analysis process starting step of the method for analyzing and processing a malicious code for a container image according to one embodiment of the present invention.

Referring to FIG. 2, the method for analyzing and processing a malicious code for a container image, which is implemented in a computing device including one or more processors and one or more memories for storing instructions executable in the processors, may include a verification analysis process starting step (e.g.: verification analysis process starting step (S103) of FIG. 1).

According to one embodiment, the verification analysis process may be a step of starting an integrity verification process for the container image when the container image has been stored in the temporary directory, and starting an image analysis process and a policy analysis process for the container image when the integrity of the container image is verified.

According to one embodiment, the verification analysis process starting step may include an integrity verification confirmation step (S201) and a verification process completion step (S203) as detailed steps for performing the above function.

In S201, the one or more processors (hereinafter referred to as a processor) may confirm manifest information of the container image to confirm a layer set for the container image, when the integrity verification process is started. In this regard, the manifest information may be JSON information that uniquely identifies an image and refers to a corresponding layer set and a corresponding size of the image.

Prior to disclosing the above description, as the container image includes all the information required to execute the container, it generally has a capacity of several hundred Mbs. When a user first downloads the image, there is no burden, but when a file is added to the existing image, it is very inefficient because hundreds of Mbs of images are downloaded again.

Accordingly, in order to solve such a problem, the container image may use the concept of layers, which has characteristics in which the container image is composed of several read-only layers (layer sets) and a new layer is generated when a file is added or modified. That is, when the container image is forged, a file included in the container image is added or modified, so that a new layer may be generated.

According to one embodiment, the processor may confirm the manifest information of the container image to confirm the layer set for the container image. In this regard, when the layer set for the container image is confirmed, the processor may perform the verification process completion step (S203).

In S203, the process may complete the integrity verification process by comparing a first digest value, which is based on the confirmed layer set, with a second digest value, which is a pre-stored reference digest, to determine the integrity of the container image based on coincidence between the first digest value and the second digest value.

Generally, original information before passing through a hash function is referred to as a message, and data after passing through the hash function is referred to as a digest. That is, the first digest value may be a hash value to allow the processor to identify the layer set. In this regard, the second digest value, which is the pre-stored reference digest, may be a hash value for the layer set of the container image that is not forged.

According to one embodiment, when the first digest value is compared with the second digest value and the first digest value matches the second digest value, the processor may determine that the container image is not forged by confirming that the layer set of the container image stored in the temporary directory is not changed. Accordingly, the processor may determine that the integrity for the container image has been verified.

According to one embodiment, when the first digest value is compared with the second digest value and the first digest value does not coincide with the second digest value, the processor may determine that the container image is forged by confirming that the layer set of the container image stored in the temporary directory is changed. Accordingly, the processor may determine that the integrity verification for the container image has failed, restrict an access of the user account to the temporary directory, and delete the temporary directory. It should be noted that the hash function applied to verify the integrity and authenticity of the container image, as described in connection with FIG. 2, may also be used to verify whether the rule code for policy information loaded into the container image is forged or corrupted as shown in FIG. 4.

Figure 3:
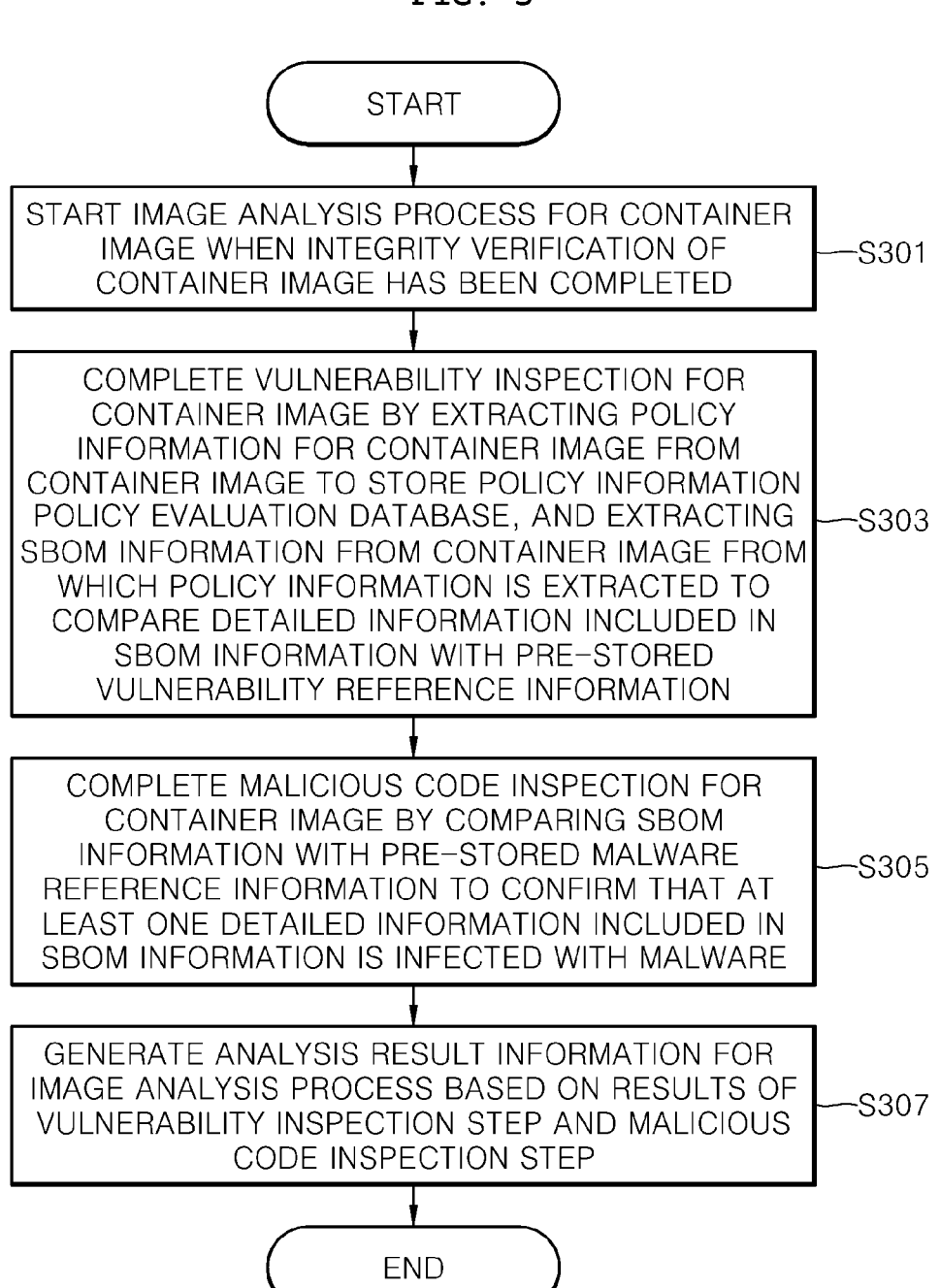
FIG. 3 is another flowchart for explaining the verification analysis process starting step of the method for analyzing and processing a malicious code for a container image according to one embodiment of the present invention.

FIG. 3 is another flowchart for explaining the verification analysis process starting step of the method for analyzing and processing a malicious code for a container image according to one embodiment of the present invention.

Referring to FIG. 3, the method for analyzing and processing a malicious code for a container image, which is implemented in a computing device including one or more processors and one or more memories for storing instructions executable in the processors, may include a verification analysis process starting step (e.g.: verification analysis process starting step (S103) of FIG. 1).

According to one embodiment, the verification analysis process may be a step of starting an integrity verification process for the container image when the container image has been stored in the temporary directory, and starting an image analysis process and a policy analysis process for the container image when the integrity of the container image is verified.

According to one embodiment, the verification analysis process starting step may include an image analysis process starting step (S301), a vulnerability inspection step (S303), a malicious code infection inspection step (S305), and a first analysis result information generation step (S307) as detailed steps for performing the above functions.

In S301, the one or more processors (hereinafter referred to as a processor) may start an image analysis process for the container image when the integrity verification of the container image has been completed by performing a function of the verification process completion step (S203) of FIG. 2.

According to one embodiment, when it is confirmed that the container image is not forged by performing the function of the verification process completion step, the processor may start the image analysis process for the container image stored in the temporary directory.

According to one embodiment, when the image analysis process is started, the processor may perform the vulnerability inspection step (S303).

In S303, when the image analysis process is started, the processor may complete a vulnerability inspection for the container image by extracting policy information for the container image from the container image to store the policy information in a policy evaluation database, and extracting software bill of materials (SBOM) information from the container image from which the policy information is extracted to compare the detailed information included in the SBOM information with pre-stored vulnerability reference information.

According to one embodiment, the policy information is information corresponding to the security policy for the container image, and may be information used in a policy analysis process, which will be described later. A detailed description of the policy analysis process will be described with reference to FIG. 4.

According to one embodiment, the processor may extract the SBOM information from the container image. The SBOM information may mean metadata representing components of software. In this regard, the processor may extract, from the container image, the SBOM information together with OS information, file information, sensitive information file list information, user access account information, package information in the image, and build information.

In this regard, the pre-stored vulnerability reference information may be reference normal information (e.g.: normal DB information, CVE information (including ID, packaging mapping information and description, and related URI)) for confirming whether the vulnerability exists in at least one of the SBOM information, OS information, file information, sensitive information file list information, user access account information, package information in the image, and build information extracted from the container image.

According to one embodiment, the processor may perform the vulnerability inspection for the container image by comparing the pre-stored vulnerability reference information with the detailed information (e.g.: vendor name, component name, component version, cryptographic hash of component, other unique identifier, subordinate relationship, and author of SBOM information) included in the SBOM information) to confirm whether the detailed information matches the pre-stored vulnerability reference information.

According to one embodiment, when the detailed information matches the pre-stored vulnerability reference information, the processor may determine that the vulnerability does not exist in the container image. In this regard, the processor may completely determine that the vulnerability does not exist in the container image, when in addition to the SBOM information, the OS information, the file information, the sensitive information file list information, the user access account information, the package information in the image, and the build information are compared with the pre-stored vulnerability reference information to confirm that all of the OS information, file information, sensitive information file list information, user access account information, package information in the image, and build information match the pre-stored vulnerability reference information.

According to one embodiment, when the vulnerability inspection step (S303) has been completed, the processor may perform the malicious code infection inspection step (S305).

In S305, when the vulnerability inspection step has been completed the process may complete a malicious code infection inspection for the container image by comparing the SBOM information with pre-stored malware reference information to confirm whether at least one of detailed information included in the SBOM information is infected with malware.

According to one embodiment, the pre-stored malware reference information is information stored in a server of a platform that manages the database, and may be reference normal information for confirming whether in addition to the detailed information included in the SBOM information, the OS information, the file information, the sensitive information file list information, the user access account information, the package information in the image, and the build information are infected with the malware.

According to one embodiment, the process may complete the malicious code inspection for the container image by confirming the detailed information, the OS information, the file information, the sensitive information file list information, the user access account information, the package information in the image, and the build information based on the pre-stored malware reference information to determine that information, which does not match the malware reference information, is information infected with the malicious code (malware).

According to one embodiment, when functions of the vulnerability inspection step (S303) and the malicious code infection inspection step (S305) have been performed, the processor may perform the first analysis result information generation step (S307).

In S307, when the functions of the vulnerability inspection step (S303) and the malicious code infection inspection step (S305) have been performed, the processor may generate first analysis result information for the image analysis process based on a result of the vulnerability inspection step and a result of the malicious code infection inspection step.

According to one embodiment, when it is confirmed from the vulnerability inspection step (S303) that the vulnerability exists in the container image and it is confirmed from the malicious code infection inspection step (S305) that the container image is not infected with the malicious code, the processor may generate first analysis result information including a content that the container image is not infected with the malicious code and the vulnerability exists in at least one of the SBOM information, the OS information, the file information, the sensitive information file list information, the user access account information, the package information in the image, and the build information.

According to one embodiment, when it is confirmed from the vulnerability inspection step (S303) that the vulnerability does not exist in the container image and it is confirmed from the malicious code infection inspection step (S305) that the container image is infected with the malicious code, the processor may generate first analysis result information including a content that the vulnerability does not exist in the container image and at least one of the SBOM information, the OS information, the file information, the sensitive information file list information, the user access account information, the package information in the image, and the build information is infected with the malicious code.

FIG. 4 is still another flowchart for explaining the verification analysis process starting step of the method for analyzing and processing a malicious code for a container image according to one embodiment of the present invention.

Referring to FIG. 4, the method for analyzing and processing a malicious code for a container image, which is implemented in a computing device including one or more processors and one or more memories for storing instructions executable in the processors, may include a verification analysis process starting step (e.g.: verification analysis process starting step (S103) of FIG. 1).

According to one embodiment, the verification analysis process may be a step of starting an integrity verification process for the container image when the container image has been stored in the temporary directory, and starting an image analysis process and a policy analysis process for the container image when the integrity of the container image is verified.

According to one embodiment, the verification analysis process starting step may include a policy analysis process starting step (S401), a policy forgery confirmation step (S403), and a second analysis result information generation step (S405) as detailed steps for performing the above functions.

In S401, the one or more processors (hereinafter referred to as a process) may start a policy analysis process for the policy information stored in a policy evaluation database when it is confirmed that the vulnerability does not exist in the container image and the container image is not infected with the malware (malicious code) based on the first analysis result information.

According to one embodiment, the policy analysis process may be a process for confirming and determining whether the security policy for the container image is forged.

According to one embodiment, the policy information is information based on the security policy of the container image, and in more detail, may be information including a rule code based on policies for all elements from application included in the container to the infrastructure to protect integrity of the container.

According to one embodiment, when the policy analysis process is started, the processor may perform the policy forgery confirmation step (S403).

In S403, when the policy analysis process is started, the processor may confirm whether the rule code based on the policy information is forged by requesting a policy management server, which manages the policy evaluation database, to analyze the policy information.

According to one embodiment, the policy management server may be a server that evaluates whether the security policy corresponding to the rule code based on the policy information of the container image is forged. Similar to the application of the hash function to verify the integrity and authenticity of the container image, as described in connection with FIG. 2, the policy management server may compare a hash string for the rule code in the container image stored in the database with a hash string for the rule code in the container image stored in the temporary directory. The policy management server may determine that the rule code within the container image in the temporary directory is forged or corrupted if the two hash strings do not match.

According to one embodiment, when information that verification of the policy information has been successful is received from the policy management server, the processor may determine that the policy information is not forged. In addition, when information that verification of the policy information has failed is received from the policy management server, the processor may determine that the policy information is forged.

According to one embodiment, when it is confirmed whether the rule code based on the policy information is forged, the processor may perform the second analysis result information generation step (S405).

In S405, when it is confirmed whether the policy information is forged by performing a function of the policy forgery confirmation step (S403), the processor may generate second analysis result information for the policy analysis process according to the confirmed forgery.

According to one embodiment, when it is confirmed that the rule code based on the policy information is not forged by performing the function of the policy forgery confirmation step (S403), the processor may generate second analysis result information including a content that the security policy based on the policy information is not forged.

According to one embodiment, when it is confirmed that the rule code based on the policy information is forged by performing the function of the policy forgery confirmation step (S403), the processor may generate second analysis result information including a content notifying that the security policy based on the policy information is forged and which security policy is forged.

Figure 5:
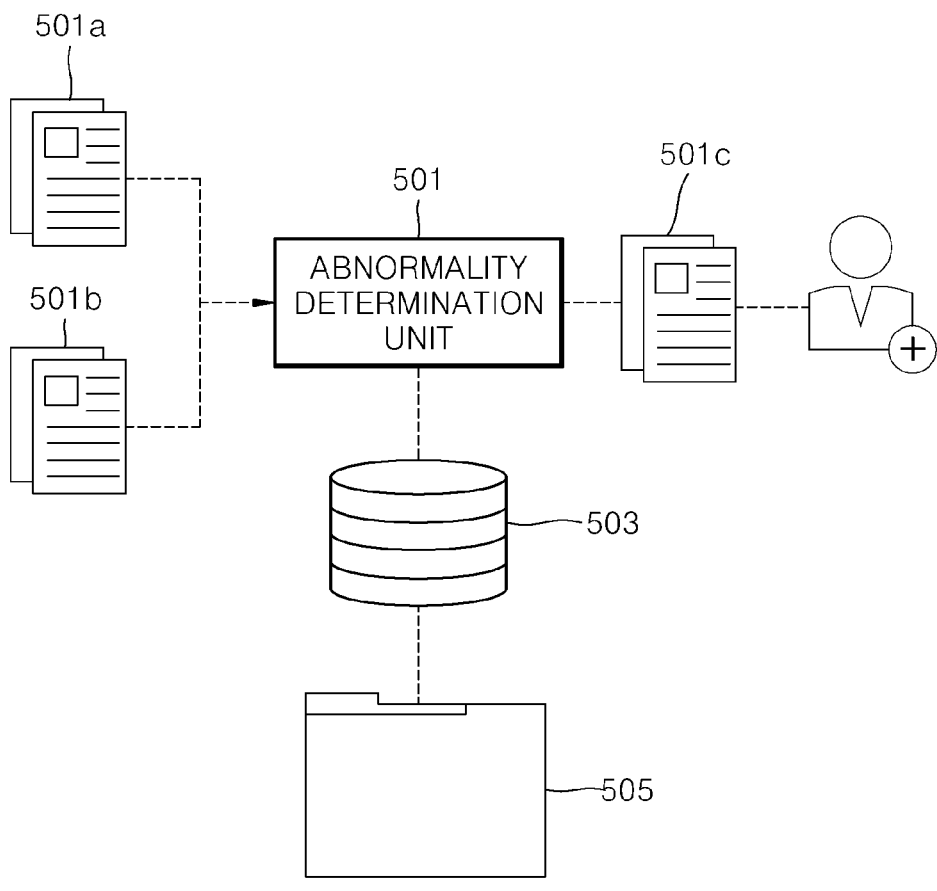
FIG. 5 is a block diagram for explaining an abnormality determination unit of a device for analyzing and processing a malicious code for a container image according to one embodiment of the present invention.

FIG. 5 is a block diagram for explaining an abnormality determination unit of a device for analyzing and processing a malicious code for a container image according to one embodiment of the present invention.

Referring to FIG. 5, the method for analyzing and processing a malicious code for a container image, which is implemented in a computing device including one or more processors and one or more memories for storing instructions executable in the processors, may include an abnormality determination unit 501 (e.g.: an abnormality determination unit which performs the same function as the abnormality determination step (S105) of FIG. 1).

According to one embodiment, as the image analysis process and the policy analysis process have been completed, when first analysis result information 501a, which is result information of the image analysis process for the container image, and second analysis result information 501b, which is result information of the policy analysis process for the container image, have been acquired, the abnormality determination unit 501 may determine an abnormality for the container image based on the first analysis result information 501a and the second analysis result information 501b.

According to one embodiment, the abnormality determination unit 501 may confirm the first analysis result information 501a and the second analysis result information 501b to confirm that the container image is not infected with the malware, but the vulnerability exists in the container image based on the first analysis result information 501a, and when it is confirmed that the security policy of the container image is not forged based on the second analysis result information 501b, the abnormality determination unit 501 may determine that the vulnerability of the container image has an abnormality.

According to one embodiment, the abnormality determination unit 501 may confirm the first analysis result information 501a and the second analysis result information 501b to confirm that the vulnerability does not exist in the container image, but the container image is infected with the malware based on the first analysis result information 501a, and when it is confirmed that the security policy of the container image is not forged based on the second analysis result information 501b, the abnormality determination unit 501 may determine that the container image has an abnormality due to infection with the malicious code.

According to one embodiment, the abnormality determination unit 501 may confirm the first analysis result information 501a and the second analysis result information 501b, and when it is confirmed that the security policy of the container image is forged based on the second analysis result information 501b in a state where it is confirmed that the vulnerability does not exist in the container image and the container image is not infected with the malware, the abnormality determination unit 501 may determine that the container image has an abnormality due to forgery of the security policy of the container image.

According to one embodiment, when it is determined (confirmed) that the container image is abnormal through the first analysis result information 501a and the second analysis result information 501b, the abnormality determination unit 501 may provide abnormality information 501c to the manager account, and simultaneously delete a temporary directory 505, and set a lock so that the plurality of user accounts are not allowed to request the download for the container image stored in a database 503.

Accordingly, the manager account may delete or modify the container image stored in the database 503 through the abnormality information 501c in a state where the lock is set so that the plurality of user accounts are not allowed to download the content image stored in the database 503.

Figure 6:
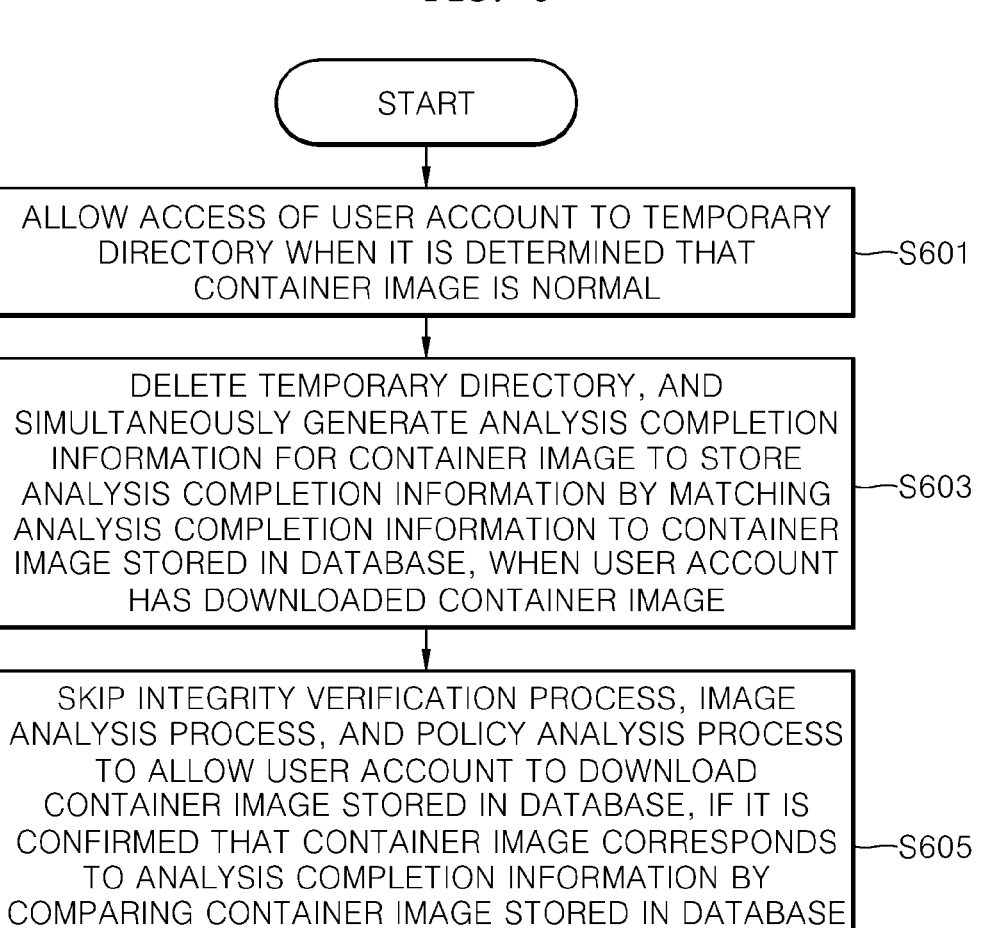
FIG. 6 is a flowchart for explaining a download allowance step of the method for analyzing and processing a malicious code for a container image according to one embodiment of the present invention.

FIG. 6 is a flowchart for explaining a download allowance step of the method for analyzing and processing a malicious code for a container image according to one embodiment of the present invention.

Referring to FIG. 6, the method for analyzing and processing a malicious code for a container image, which is implemented in a computing device including one or more processors and one or more memories for storing instructions executable in the processors, may include a download allowance step (e.g.: download allowance step (S107) of FIG. 1).

According to one embodiment, when it is determined that the container image is normal by performing the function of the abnormality determination step (e.g.: abnormality determination step (S105) of FIG. 1), the processor may allow the user account to download the container image by allowing the download of the container image.

According to one embodiment, the download allowance step may include an access allowance step (S601), an analysis completion information storage step (S603), and an analysis process skipping step (S605) as detailed steps for performing the above functions.

In S601, when it is determined that the container image is normal by performing the function of the abnormality determination step, the one or more processors (hereinafter referred to as a processor) may allow an access of the user account to the temporary directory.

According to one embodiment, when the container image is normal, the processor may allow the user account to download the container image stored in the temporary directory by restricting the access of the user account to the container image in the temporary directory, not to the database.

According to one embodiment, when the user account has downloaded the container image as the access allowance step (S601) has been completed, the processor may perform the analysis completion information storage step (S603).

In S603, when the user account has downloaded the container image, the processor may delete the temporary directory, and simultaneously generate analysis completion information for the container image to store the analysis completion information by matching the analysis completion information to the container image stored in the database.

According to one embodiment, the analysis completion information is information proving that the container image is normal by the integrity verification process, image analysis process, and policy analysis process performed on the container image, and may include an identification value for the container image stored in the temporary directory. The identification value may be a component proving that the container image stored in the database corresponds to the container image stored in the temporary directory.

According to one embodiment, the processor may delete the temporary directory when the user account has completed the download of the container image. In this regard, the processor may store the analysis completion information by matching the analysis completion information to the container image stored in the database, which corresponds to the container image stored in the temporary directory.

According to one embodiment, the processor may perform the analysis process skipping step (S605) when receiving the request to download the container image stored in the database again from the user account in a state where the analysis completion information storage step (S603) has been performed.

In S605, when the request to download the container image stored in the database is received again by the user account in a state where the analysis completion information storage step (S603) has been completed, if it is confirmed that the container image corresponds to the analysis completion information by comparing the container image stored in the database with the analysis completion information, the processor may skip the integrity verification process, the image analysis process, and the policy analysis process to allow the user account to download the container image stored in the database.

According to one embodiment, when the request to download the container image stored in the database is received again from the user account, the processor may compare the container image with the analysis completion information matched to the container image stored in the database. In this case, the processor may confirm that an identification value based on the analysis completion information is the same as an identification value of the container image stored in the database to confirm that the container image stored in the database corresponds to the analysis completion information.

Figure 7:
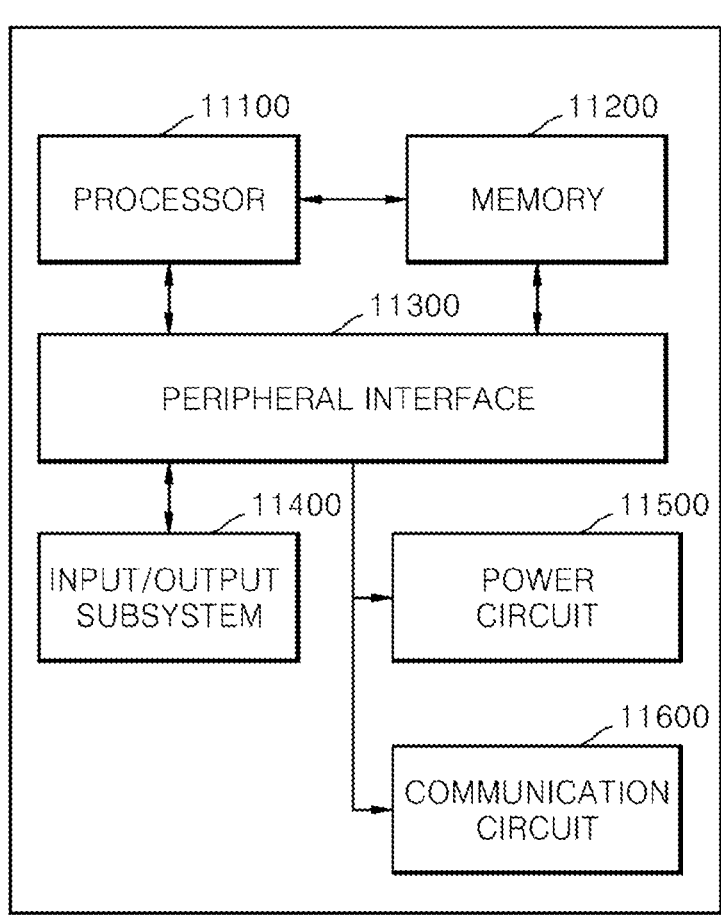
FIG. 7 is a diagram for illustrating an example of an internal configuration of a computing device according to one embodiment of the present invention.

Accordingly, the processor may skip the integrity verification process, the image analysis process, and the policy analysis process to allow the user account to download the container image stored in the database FIG. 7 is a diagram for explaining an example of an internal configuration of a computing device according to one embodiment of the present invention.

FIG. 7 illustrates an example of an internal configuration of a computing device according to one embodiment of the present invention, and in the following descriptions, descriptions for unnecessary embodiments overlapping with the above-described descriptions of FIGS. 1 to 6 will be omitted.

As shown in FIG. 7, a computing device 10000 may at least include at least one processor 11100, a memory 11200, a peripheral interface 11300, an input/output (I/O) subsystem 11400, a power circuit 11500, and a communication circuit 11600. In this case, the computing device 10000 may correspond to a user terminal A connected to a tactile interface device or a computing device B described above.

The memory 11200 may include, for example, a high-speed random access memory, a magnetic disk, a static random access memory (SRAM), a dynamic RAM (DRAM), read only memory (ROM), a flash memory, and a non-volatile memory. The memory 11200 may include a software module, an instruction set, or a variety of data as required for operation of the computing device 10000.

In this case, access from another component, such as the processor 11100 and the peripheral interface 11300, to the memory 11200 may be controlled by the processor 11100.

The peripheral interface 11300 may couple an input and/or output peripheral device of the computing device 10000 to the processor 11100 and the memory 11200. The processor 1410 may perform a variety of functions for the computing device 10000 and may process data by executing the software module or the instruction set stored in the memory 11200.

The input/output subsystem 11400 may couple various input/output peripheral devices to the peripheral interfaces 11300. For example, the input/output subsystem 11400 may include a controller for coupling the peripheral devices, such as a monitor, a keyboard, a mouse, a printer, and a touch screen or a sensor as necessary, to the peripheral interface 11300. According to another aspect, the input/output peripheral devices may be coupled to the peripheral interface 11300 without using the input/output subsystem 11400.

The power circuit 112500 may supply power to all of or a part of the components of a terminal. For example, the power circuit 11500 may include a power management system, at least one power source such as a battery or alternating circuit (AC), a charging system, a power failure detection circuit, a power converter or inverter, a power status indicator, or other components for generating, managing and distributing power.

The communication circuit 11600 may communicate with other computing devices using at least one external port.

Alternatively, as described above, the communication circuit 11600 may communicate with other computing devices by including a radio frequency (RF) circuit and thereby transmitting and receiving an RF signal known as an electromagnetic signal.

The embodiment of FIG. 7 is merely an example of the computing device 10000, and the computing device 10000 may have a configuration or an arrangement in which a part of the components illustrated in FIG. 7 has been omitted, or it may further include components that are not illustrated in FIG. 7 or it may include the coupling of two or more components. For example, a computing device for a communication terminal of a mobile environment may further include a touch screen, a sensor, and the like, in addition to the components of FIG. 7. A circuit for RF communication using a variety of communication methods (wireless fidelity (Wi-Fi), 3rd generation (3G), long term evolution (LTE), Bluetooth, near field communication (NFC), and ZigBee) may be included in the communication circuit 11600. Components includable in the computing device 10000 may be implemented as hardware that includes an integrated circuit specified for at least one signal processing or application, software, or a combination of hardware and software.

The methods according to the embodiment of the present invention may be implemented in the form of a program instruction that may be executed through various computing devices, thereby being recorded in computer-readable media. In particular, the program according to the present embodiment may be configured with a PC-based program or a mobile terminal dedicated application. An application to which the present invention is applied may be installed in a user terminal through a file provided by a file distribution system. For example, the file distribution system may include a file transmission unit (not shown) that transmits files according to a request of the user terminal.

The device described above may be implemented as hardware components, software components, and/or a combination of the hardware components and the software components. For example, the device and the components described above may be implemented using one or more general-purpose or special purpose computers, such as, for example, a processor, a controller and an arithmetic logic unit (ALU), a digital signal processor, a microcomputer, a field programmable gate array (PGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of the processing device is used as singular; however, one skilled in the art will be appreciated that the processing device may include multiple processing elements and multiple types of processing elements. For example, the processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software may also be distributed over network-connected computing devices so that the software is stored and executed in a distributed manner. The software and data may be stored by one or more computer-readable recording media.

The above-described embodiments of the present invention may be recorded in computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of computer-readable recording media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

As described above, although the embodiments have been described with reference to limited examples and drawings, it will be apparent to one of ordinary skill in the art that various modifications and variations may be made in the above descriptions. For example, suitable results may be achieved if the described techniques are performed in a different order, and/or if components in a described system, structure, device, or circuit are combined in a different manner as described above, and/or replaced or supplemented by other components or their equivalents. Therefore, other implementations, other embodiments, and equivalents of the claims are within the scope of the following claims.

What is claimed is:

1. A method for analyzing and processing a malicious code for a container image, which is implemented in a computing device including one or more processors and one or more memories for storing instructions executable in the processors, the method comprising:

a container image storage step of storing a container image in a temporary directory, which is a virtual storage interworking with a database, by copying the container image stored in the database, when a download request for the container image stored in the database is received from a user account;

a verification analysis process starting step of starting an integrity verification process for the container image when the container image has been stored in the temporary directory, and starting an image analysis process and a policy analysis process when integrity of the container image is verified;

an abnormality determination step of determining an abnormality for the container image based on first analysis result information, which is result information of the image analysis process for the container image, and second analysis result information, which is result information of the policy analysis process for the container image, when the first analysis result information and the second analysis result information have been acquired as the image analysis process and the policy analysis process have been completed; and a download allowance step of allowing the user account to download the container image by allowing a download of the container image, when it is determined that the container image is normal by performing a function of the abnormality determination step, wherein the verification analysis process starting step comprises:

a policy analysis process starting step of starting an analysis of policy information stored in policy evaluation database after confirming that the container image stored in the temporary directory is not vulnerable and is not infected with malware based on first analysis result information;

a policy forgery confirmation step of verifying whether a rule code for the policy information stored in the policy evaluation database is forged by requesting a policy management server, which manages the policy evaluation database, to perform;

comparing a hash string generated for a rule code for the policy information in the container image stored in the policy evaluation database to a hash string generated for a rule code for the policy information in container image stored in the database; and identifying forgeries in the rule code in the container image stored in the policy evaluation database when the two hash strings do not match; and an analysis result information generation step of, when the policy information is forged by a function of the policy forgery confirmation step, generating the second analysis result information about the policy analysis process according to the confirmed forgery.

2. The method of claim 1, wherein the temporary directory is a temporary storage for confirming whether the container image includes a malicious code before the user account downloads the container image, in which the temporary directory is generated when the download request is received from the user account, and is immediately deleted when the download allowance step is completed or the container image includes the malicious code.

3. The method of claim 2, wherein the verification analysis process starting step includes:

an integrity verification confirmation step of confirming manifest information of the container image to confirm a layer set for the container image, when the integrity verification process is started; and a verification process completion step of completing the integrity verification process by comparing a first digest value, which is based on the confirmed layer set, with a second digest value, which is a pre-stored reference digest, to determine the integrity of the container image based on coincidence between the first digest value and the second digest value.

4. The method of claim 3, wherein the verification analysis process starting step further includes:

an image analysis process starting step of starting an image analysis process for the container image when the integrity of the container image has been verified by performing a function of the verification process completion step;

a vulnerability inspection step of, when the image analysis process is started, completing a vulnerability inspection for the container image by extracting the policy information for the container image from the container image to store the policy information in the policy evaluation database, and extracting software bill of materials (SBOM) information from the container image from which the policy information is extracted to compare detailed information included in the SBOM information with pre-stored vulnerability reference information;

a malicious code infection inspection step of completing a malicious code inspection for the container image by comparing the SBOM information with pre-stored malware reference information to confirm whether at least one of detailed information included in the SBOM information is infected with malware, when the vulnerability inspection step has been completed; and an analysis result information generation step of generating the first analysis result information for the image analysis process based on a result of the vulnerability inspection step and a result of the malicious code infection inspection step, when functions of the vulnerability inspection step and malicious code infection inspection step have been performed.

5. The method of claim 1, wherein in the abnormality determination step, if the first analysis result information and the second analysis result information have been generated, when it is determined that the container image is abnormal based on the first analysis result information and the second analysis result information, abnormality information about the container image is provided to a manager account, the temporary directory is deleted, and a lock is set so that a plurality of user accounts are not allowed to request the download of the container image stored in the database.

6. The method of claim 5, wherein the download allowance step includes:

an access allowance step of allowing an access of the user account to the temporary directory when it is determined that the container image is normal by performing the function of the abnormality determination step;

an analysis completion information storage step of storing analysis completion information for the container image by deleting the temporary directory, and simultaneously, generating the analysis completion information to match the analysis completion information to the container image stored in the database, when the user account has downloaded the container image; and an analysis process skipping step of skipping the integrity verification process, the image analysis process, and the policy analysis process to allow the user account to download the container image stored in the database, if the container image corresponds to the analysis completion information by comparing the container image stored in the database with the analysis completion information, when a request to download the container image stored in the database is received again by the user account in a state where the analysis completion information storage step is completed.

7. A device for analyzing and processing a malicious code for a container image, which is implemented in a computing device including one or more processors and one or more memories for storing instructions executable in the processors, the device comprising:

a container image storage processor which stores a container image in a temporary directory, which is a virtual storage interworking with a database, by copying the container image stored in the database, when a download request for the container image stored in the database is received from a user account;

a verification analysis process starting processor which starts an integrity verification process for the container image when the container image has been stored in the temporary directory, and starts a verification analysis process and a policy analysis process when integrity of the container image is verified;

an abnormality determination processor which determines an abnormality for the container image based on first analysis result information, which is result information of the image analysis process for the container image, and second analysis result information, which is result information of the policy analysis process for the container image, when the first analysis result information and the second analysis result information have been acquired as the image analysis process and the policy analysis process have been completed; and a download allowance processor which allows the user account to download the container image by allowing a download of the container image, when it is determined that the container image is normal by performing a function of the abnormality determination processor, wherein the verification analysis process starting processor is configured to:

start a policy analysis process of staring an analysis of policy information stored in policy evaluation database after confirming that the container image stored in the temporary directory is not vulnerable and is not infected with malware based on first analysis result information;

verify whether a rule code for the policy information stored in the policy evaluation database is forged by requesting a policy management server managing the policy evaluation database, wherein the policy management server is configured to (1) compare a hash string generated for a rule code for the policy information in the container image stored in the policy evaluation database to a hash string generated for a rule code for the policy information in container image stored in the database and (2) identify forgeries in the rule code in the container image stored in the policy evaluation database when the two hash strings do not match; and generate the second analysis result information about the policy analysis process based on confirmed forgery when the policy information is found be forged.

8. A non-transitory computer-readable recording medium that stores instructions for allowing a computing device to perform the following steps, in which the steps comprise:

a container image storage step of storing a container image in a temporary directory, which is a virtual storage interworking with a database, by copying the container image stored in the database, when a download request for the container image stored in the database is received from a user account;

a verification analysis process starting step of starting an integrity verification process for the container image when the container image has been stored in the temporary directory, and starting an image analysis process and a policy analysis process when integrity of the container image is verified;

an abnormality determination step of determining an abnormality for the container image based on first analysis result information, which is result information of the image analysis process for the container image, and second analysis result information, which is result information of the policy analysis process for the container image, when the first analysis result information and the second analysis result information have been acquired as the image analysis process and the policy analysis process have been completed; and a download allowance step of allowing the user account to download the container image by allowing a download of the container image, when it is determined that the container image is normal by performing a function of the abnormality determination step, wherein the verification analysis process starting step comprises:

starting an analysis of the policy information stored in policy evaluation database after confirming that the container image stored in the temporary directory is not vulnerable and is not infected with malware based on first analysis result information;

verifying whether a rule code for the policy information stored in policy evaluation database is forged by requesting a policy management server, which manages the policy evaluation database, to perform;

comparing a hash string generated for a rule code for the policy information in the container image stored in the policy evaluation database to a hash string generated for a rule code for the policy information in container image stored in the database; and identifying forgeries in the rule code in the container image stored in the policy evaluation database when the two hash strings do not match; and generating the second analysis result information about the policy analysis process based on the confirmed forgery when the policy confirmation is found to be forged.

* * * * *